United States Patent
Matsumoto et al.

(10) Patent No.: US 10,305,082 B2
(45) Date of Patent: May 28, 2019

(54) TERMINAL-SECURING AUXILIARY MEMBER

(71) Applicant: YAZAKI CORPORATION, Tokyo (JP)

(72) Inventors: Yusuke Matsumoto, Shizuoka (JP); Takahiro Shiohama, Shizuoka (JP); Masao Iwata, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 343 days.

(21) Appl. No.: 14/992,661

(22) Filed: Jan. 11, 2016

(65) Prior Publication Data

US 2016/0126529 A1 May 5, 2016

Related U.S. Application Data

(63) Continuation of application No. PCT/JP2014/070762, filed on Aug. 6, 2014.

(30) Foreign Application Priority Data

Aug. 6, 2013 (JP) .................................. 2013-163276

(51) Int. Cl.
*H01M 2/20* (2006.01)
*H01M 2/30* (2006.01)
(Continued)

(52) U.S. Cl.
CPC ............ *H01M 2/30* (2013.01); *H01R 11/281* (2013.01); *H01H 2085/025* (2013.01); *H01M 2/305* (2013.01); *H01R 11/287* (2013.01)

(58) Field of Classification Search
None
See application file for complete search history.

(56) References Cited

U.S. PATENT DOCUMENTS 5,804,770 A * 9/1998 Tanaka ............... H01M 2/206
174/138 F
2001/0024909 A1* 9/2001 Wakata ............... H01R 11/283
439/680

(Continued)

FOREIGN PATENT DOCUMENTS

JP 2008-155746 A 7/2008
JP 2009-110843 A 5/2009
(Continued)

OTHER PUBLICATIONS

International Search Report and Written Opinion of the International Search Report for PCT/JP2014/070762 dated Oct. 21, 2014.
(Continued)

*Primary Examiner* — Lucas J. O'Donnell
(74) *Attorney, Agent, or Firm* — Kenealy Vaidya LLP

(57) ABSTRACT

A terminal-securing auxiliary member includes a terminal securing portion which is to be fastened to a battery post and which is to be secured to a battery terminal, the battery post disposed at a post disposing portion of a battery, the battery having a portion of irregular height on an upper surface thereof in a circumferential edge of the post disposing portion, the battery terminal to which a battery-direct-attached type fuse unit is to be fastened; a battery joining portion which engages with the portion of the irregular height to restrict movement in a direction along the upper surface of the battery; and a connecting portion which connects the terminal securing portion and the battery joining portion.

16 Claims, 17 Drawing Sheets

(51) Int. Cl.
*H01R 11/28* (2006.01)
*H01H 85/02* (2006.01)

(56) References Cited

U.S. PATENT DOCUMENTS

| | | | |
|---|---|---|---|
| 2009/0108982 A1 | 4/2009 | Ohashi et al. | |
| 2012/0100761 A1* | 4/2012 | Gro e | H01M 2/202 |
| | | | 439/774 |
| 2013/0071728 A1* | 3/2013 | Shibanuma | H01M 2/0404 |
| | | | 429/179 |

FOREIGN PATENT DOCUMENTS

| | | |
|---|---|---|
| JP | 2009-110856 A | 5/2009 |
| JP | 2009-295526 A | 12/2009 |
| JP | 2010-61813 A | 3/2010 |
| JP | 2010-129315 A | 6/2010 |
| JP | 2010-170899 A | 8/2010 |

OTHER PUBLICATIONS

International Preliminary Report on Patentability and English language Written Opinion of the International Search Report for PCT/JP2014/070762 dated Feb. 9, 2016.
Japanese Office Action for the related Japanese Patent Application No. 2013-163276 dated Aug. 8, 2017.

* cited by examiner

TERMINAL-SECURING AUXILIARY MEMBER

CROSS REFERENCE TO RELATED APPLICATION

This application is a continuation of PCT application No. PCT/JP2014/070762, which was filed on Aug. 6, 2014 based on Japanese Patent Application (No. 2013-163276) filed on Aug. 6, 2013, the contents of which are incorporated herein by reference. Also, all the references cited herein are incorporated as a whole.

BACKGROUND OF THE INVENTION

1. Technical Field

One or more embodiments of the present invention relate to a terminal-securing auxiliary member which secures a battery terminal to a battery.

2. Description of the Related Art

FIG. 14 illustrates an attaching structure of a battery-direct-attached type fuse unit to a battery which is disclosed in a below-described Patent Literature 1. FIG. 15 illustrates an attaching structure of a battery-direct-attached type fuse unit to a battery which is similar to the structure disclosed in the Patent Literature 1.

In FIGS. 14 and 15, reference numeral 110 denotes a battery terminal which is fastened to a battery post 210 of a battery 200, and reference numeral 120 denotes a battery-direct-attached type fuse unit.

As illustrated in FIG. 15, the battery terminal 110 includes a post fastened portion 111 which is to be fastened to the battery post 210 of the battery 200 and a fuse unit attaching portion 112 to which the battery-direct-attached type fuse unit 120 is to be screwed.

The post fastened portion 111 includes a post insertion hole 111a through which the battery post 210 is inserted, a slit 111b which cuts to separate partially the post insertion hole 111a and a tightening screw 111c which tightens to narrow a gap at the slit portion 111b so that the post fastened portion 111 is secured to the battery post 210.

The fuse unit attaching portion 112 is such that a stud bolt 112b is provided on a conduction plate portion 112a which is integral with the post fastened portion 111 so as to rise therefrom. The stud bolt 112b is provided so that an extending direction of a central axis C1 of the stud bolt 112b becomes parallel to the direction of a central axis C2 of the post insertion hole 111a of the post fastened portion 111.

FIG. 16 illustrates a state in which the battery terminal 110 is attached to the battery post 210 of the battery 200 with the battery terminal 110 oriented in a proper attaching direction. The proper attaching orientation of the battery terminal 110 is, as illustrated in FIG. 16, an orientation in which a straight line L1 that connects a center of the post insertion hole 111a and a center of the stud bolt 112b perpendicularly intersects a side surface 201 of the battery 200.

The battery-direct-attached type fuse unit 120 includes a terminal connecting portion 121 having a terminal connecting conductor 121a which is to be fastened to the fuse unit attaching portion 112 to be electrically connected to the battery post 210 via the battery terminal 110 and a resin housing 122 which houses a plurality of connecting terminals which branch off to be connected to the terminal connecting conductor 121a and a plurality of fuses.

In the resin housing 122, a portion denoted by reference numeral 122a is a terminal housing portion which houses the plurality of connecting terminals which branch off to be connected to the terminal connecting conductor 121a. An electric wire which is fed from the battery 200 is connected to the connecting terminals housed in the terminal housing portion 122a. Additionally, a portion denoted by reference numeral 122b is a portion which houses the plurality of fuses provided between the terminal connecting conductor 121a and the connecting terminals.

The resin housing 122 which houses the pluralities of fuses and connecting terminals is provided into a shape which hangs perpendicularly from an end portion of the terminal connecting conductor 121a. When the battery-direct-attached type fuse unit 120 is attached properly to the battery terminal 110 which is attached to the battery post 210 while being oriented in the proper attaching direction, as illustrated in FIG. 16, the resin housing 122 is disposed along the side surface 201 of the battery 200 to thereby reduce the protrusion of the resin housing 122 from the battery 200.

Patent Literature 1 is JP-A-2008-155746.

SUMMARY OF THE INVENTION

In the attaching structures illustrated in the Patent Literature 1 and FIG. 15, as illustrated in FIG. 17, there may be a situation in which the orientation of the battery terminal 110 attached is inclined by an angle θ from the proper attaching orientation. Then, when the orientation of the battery terminal 110 attached is inclined, the resin housing 122 of the battery-direct-attached type fuse unit 120 may interfere with the side surface 201 of the battery 200, and the battery-direct-attached type fuse unit 120 may be damaged.

As a countermeasure to prevent this drawback, it is considered to improve the structure itself of the battery terminal 110 or the structure itself of the battery-direct-attached type fuse unit 120 in such a way as to avoid the interference of the battery-direct-attached type fuse unit 120 with the battery 200. However, with this countermeasure, a battery terminal and a battery-direct-attached type fuse unit have to be newly redesigned, and no interference preventing means can be taken for existing products.

Then, one of objects of the embodiments of the invention relates to address the above described situation and is to provide a terminal securing auxiliary member which can prevent a battery-direct-attached type fuse unit which is connected to a battery terminal from interfering with a side surface of a battery without modifying the construction of the battery terminal and/or the battery-direct-attached type fuse unit.

The object of the embodiments of the invention is achieved by the following configurations.

(1) A terminal-securing auxiliary member including:
a terminal securing portion which is to be fastened to a battery post and which is to be secured to a battery terminal, the battery post disposed at a post disposing portion of a battery, the battery having a portion of irregular height on an upper surface thereof in a circumferential edge of the post disposing portion, the battery terminal to which a battery-direct-attached type fuse unit is to be fastened;
a battery joining portion which engages with the portion of the irregular height to restrict movement in a direction along the upper surface of the battery; and
a connecting portion which connects the terminal securing portion and the battery joining portion.

(2) The terminal-securing auxiliary member according to (1) above, wherein the portion of the irregular height includes a pair of attaching holes which are provided in the upper surface of the battery for attachment of a post cover that covers the battery post from above.

(3) The terminal-securing auxiliary member according to (1) or (2) above, wherein the connecting portion comprises a thin hinge portion which crosses the connecting portion in a direction perpendicular to a straight line that connects the terminal securing portion and the battery joining portion, and a separation distance between the terminal securing portion and the battery joining portion is adjusted by adjusting a bending angle of the thin hinge portion.

According to the configuration described under (1) above, the terminal-securing auxiliary member can be secured to the battery terminal by the terminal securing portion. Then, when the battery terminal to which the terminal-securing auxiliary member is assembled is fastened to the battery post of the battery, the battery joining portion is engaged with the portion of the irregular height on the battery upper surface, whereby the attaching orientation of the battery terminal is secured in the proper attaching orientation.

This can prevent the attaching orientation of the battery terminal from being inclined. Consequently, it is possible to surely prevent the interference of the battery-direct-attached type fuse unit which is fastened to the distal end of the battery terminal with the side surface of the battery which would otherwise be caused due to the inclination of the attaching orientation of the battery terminal. Consequently, it is possible to prevent the damage to the battery-direct-attached type fuse unit which would otherwise be caused by the interference thereof with the side surface of the battery.

Additionally, according to the configuration described under (1) above, the terminal-securing auxiliary member is interposed between the battery terminal and the battery to restrict the battery terminal from rotating about the battery post which functions as a rotation center. This obviates the necessity of modifying the battery terminal and the battery-direct-attached type fuse unit. Consequently, the battery terminal and the battery-direct-attached type fuse unit do not have to be newly redesigned, whereby the prevention of the interference of the battery-direct-attached type fuse unit with the battery can be realized inexpensively. Additionally, the interference prevention can also be realized on the existing products of the battery terminal and battery-direct-attached type fuse units.

According to the configuration described under (2) above, the portion of the irregular height on the battery upper surface with which the battery joining portion engages includes the attaching holes which are ordinarily provided on the battery upper surface for attachment of the post cover which covers the battery post from above. Namely, no exclusive engaging structure has to be added to the battery for attachment of the terminal-securing auxiliary member, and the terminal-securing auxiliary member of the embodiments of the invention can be applied to an existing battery without any modification made on the battery to realize the prevention of interference of the battery-direct-attached type fuse unit with the battery.

According to the configuration described under (3) above, the separation distance between the terminal securing portion and the battery joining portion can be adjusted by adjusting the bending angle of the thin hinge portion which is provided at the connecting portion. Because of this, the terminal-securing auxiliary member of the embodiments of the invention can be used on different types of batteries among which separation distances between the battery post of the battery and the portion of the irregular height on the battery upper surface differ. Thus, the versatility of the terminal-securing auxiliary member can be enhanced.

According to the terminal-securing auxiliary member of the embodiments of the invention, it is possible to prevent the battery-direct-attached type fuse unit which is connected to the battery terminal from interfering with the side surface of the battery without modifying the constructions of the existing terminal and/or battery-direct-attached type fuse unit.

Thus, the embodiments of the invention have briefly been described. Further, the details of the invention will be clarified further by perusing an exemplary mode for carrying out the invention which will be described below (hereinafter, referred to as an "embodiment") by reference to accompanying drawings.

DETAILED DESCRIPTION OF THE EXEMPLARY EMBODIMENTS

Hereinafter, an exemplary embodiment of a terminal-securing auxiliary member according to an embodiment of the invention will be described in detail by reference to the drawings.

Figure 1:
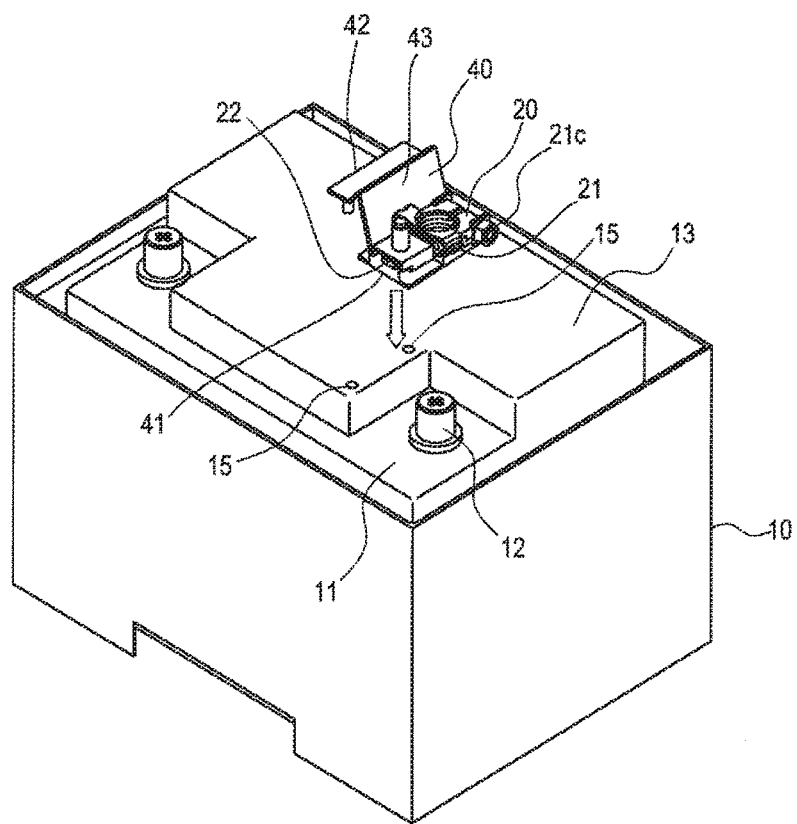
FIG. 1 is a perspective view of a battery terminal which is attached to a battery by assembling thereto an embodiment of a terminal-securing auxiliary member according to the invention.
Figure 2:
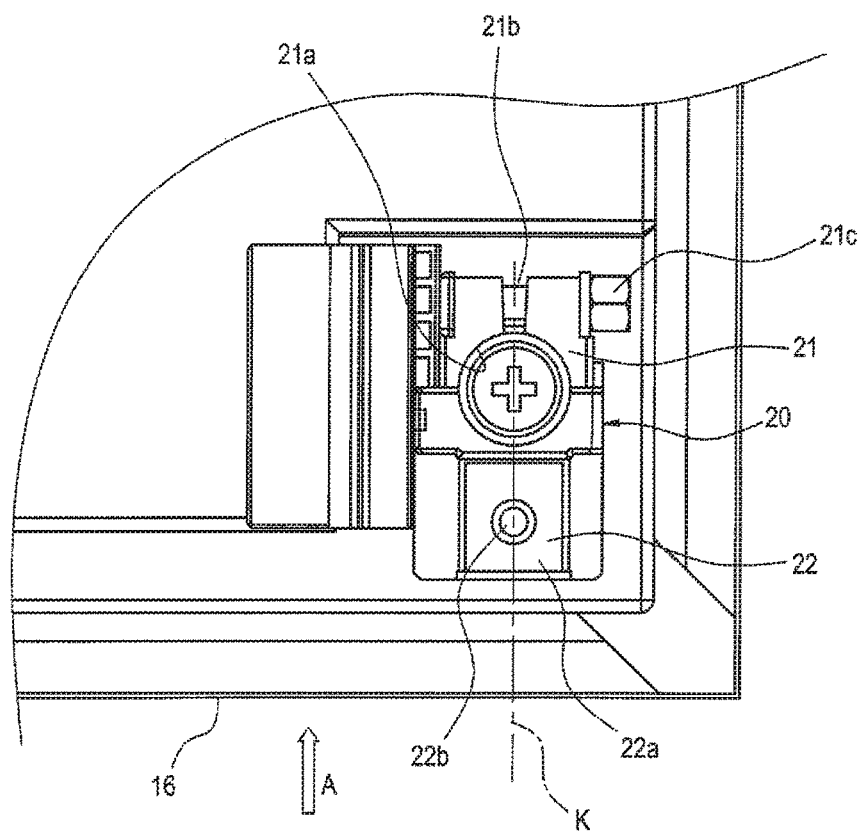
FIG. 2 is a plan view of a state in which the battery terminal is positioned on the battery by the terminal-securing auxiliary member according to the embodiment of the invention.
Figure 3:
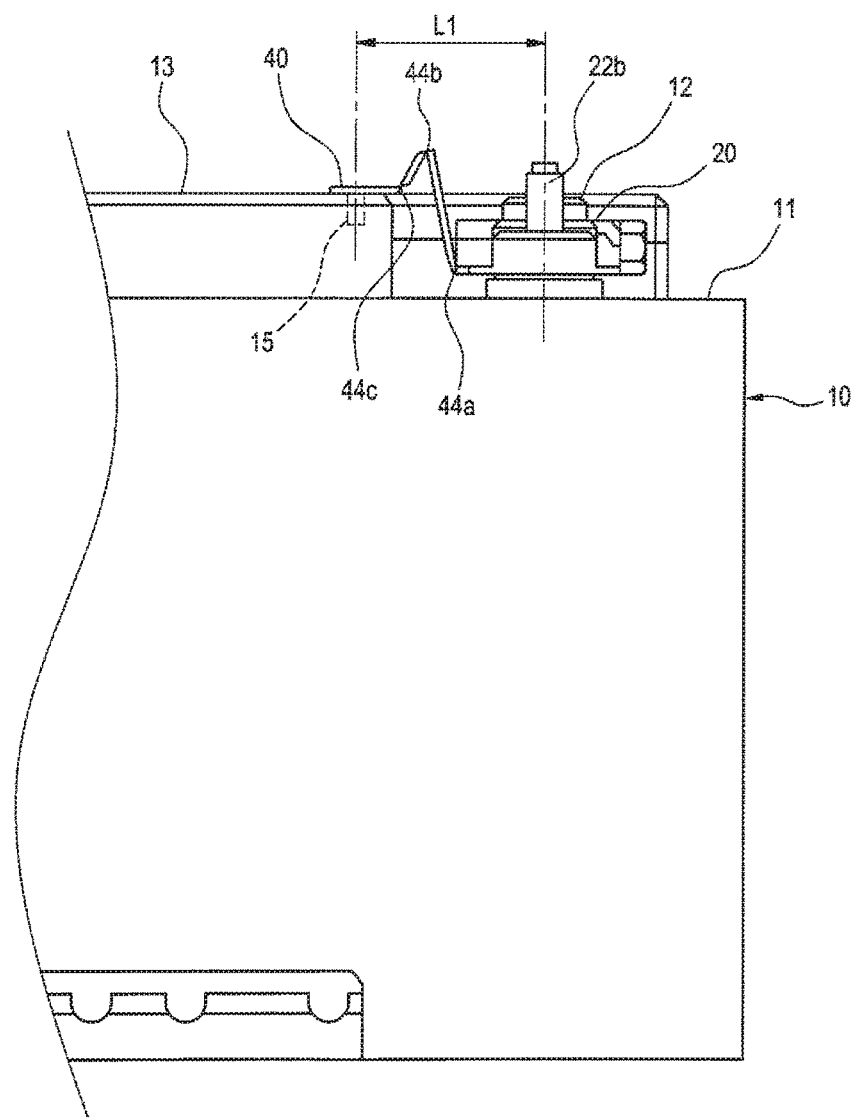
FIG. 3 is a view as seen in a direction indicated by an arrow A in FIG. 2.
Figure 6:
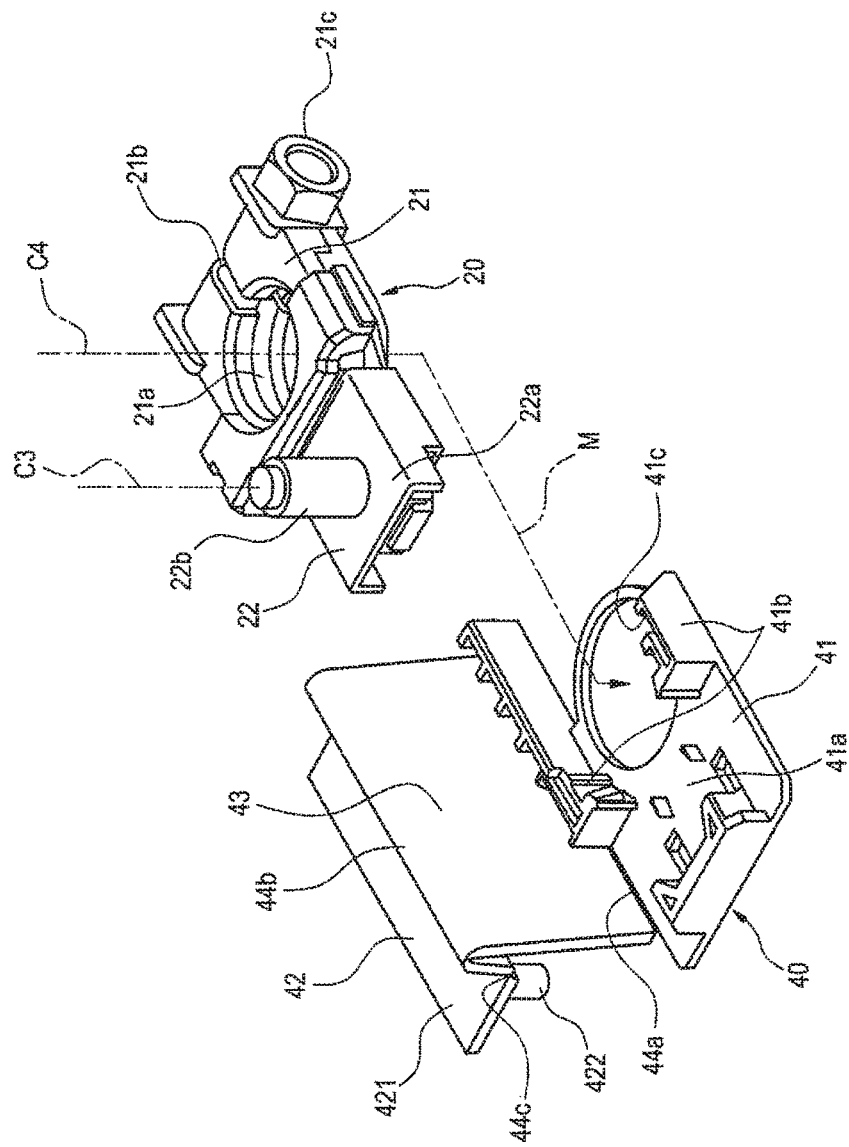
FIG. 6 is a perspective view illustrating an assembled state of the terminal-securing auxiliary member according to the embodiment of the invention and the battery terminal.
Figure 7:
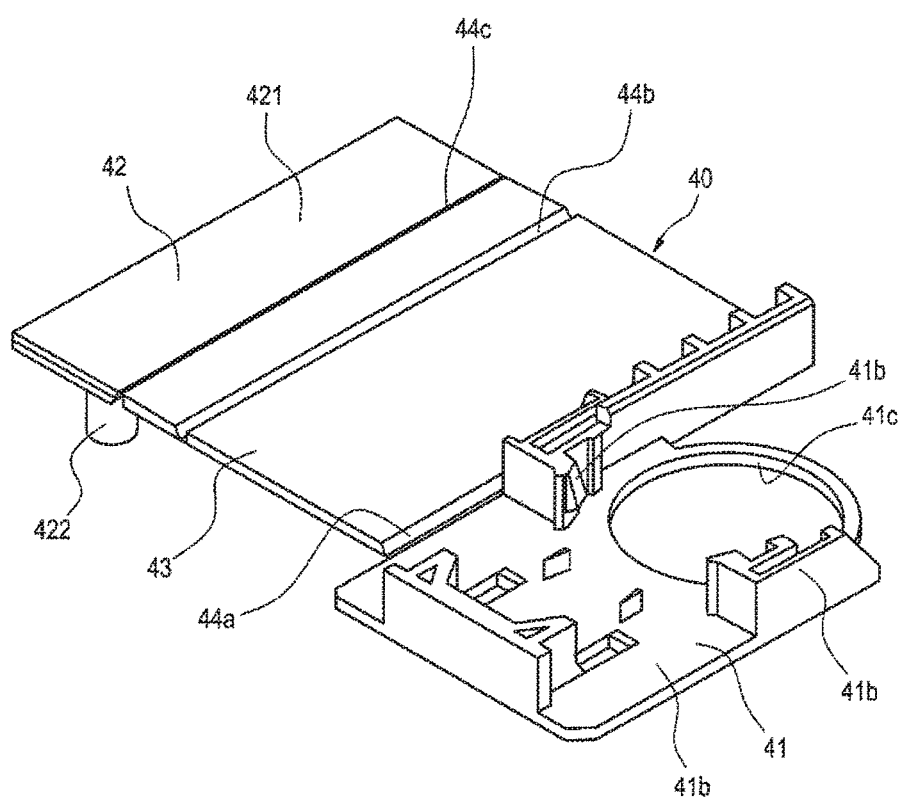
FIG. 7 is a perspective view of a state in which a connecting portion of the terminal-securing auxiliary member according to the embodiment of the invention extends flat out.
Figure 8:
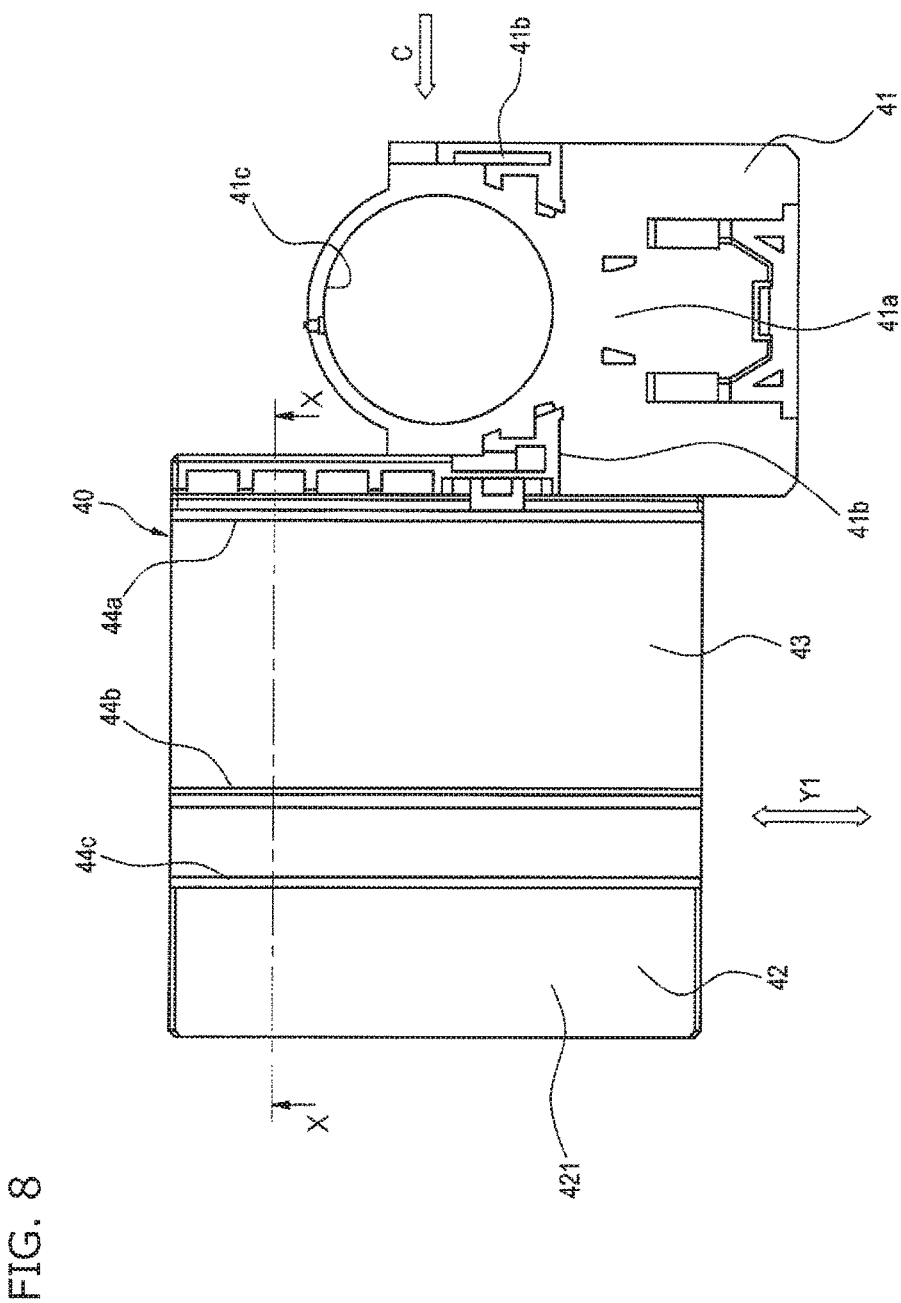
FIG. 8 is a plan view of the terminal-securing auxiliary member illustrated in FIG. 7.
Figure 9:
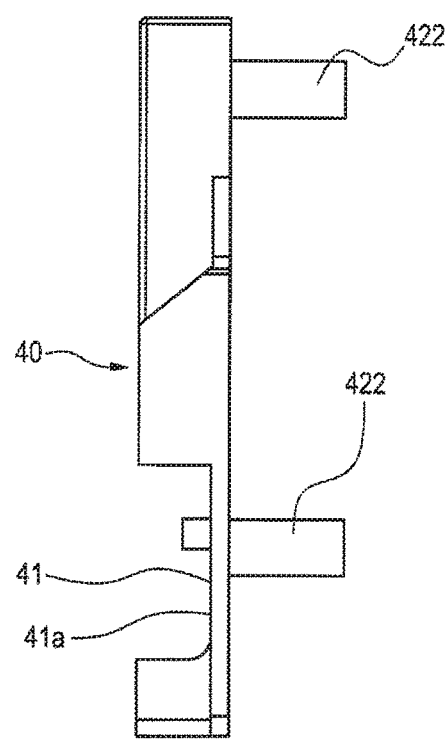
FIG. 9 is a view as seen in a direction indicated by an arrow C in FIG. 8.
Figure 10:
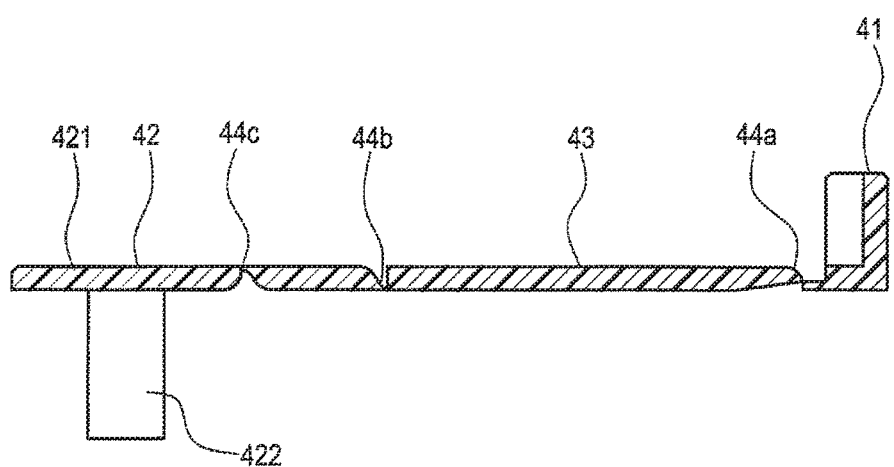
FIG. 10 is a sectional view taken along a line X-X in FIG. 8.
Figure 11:
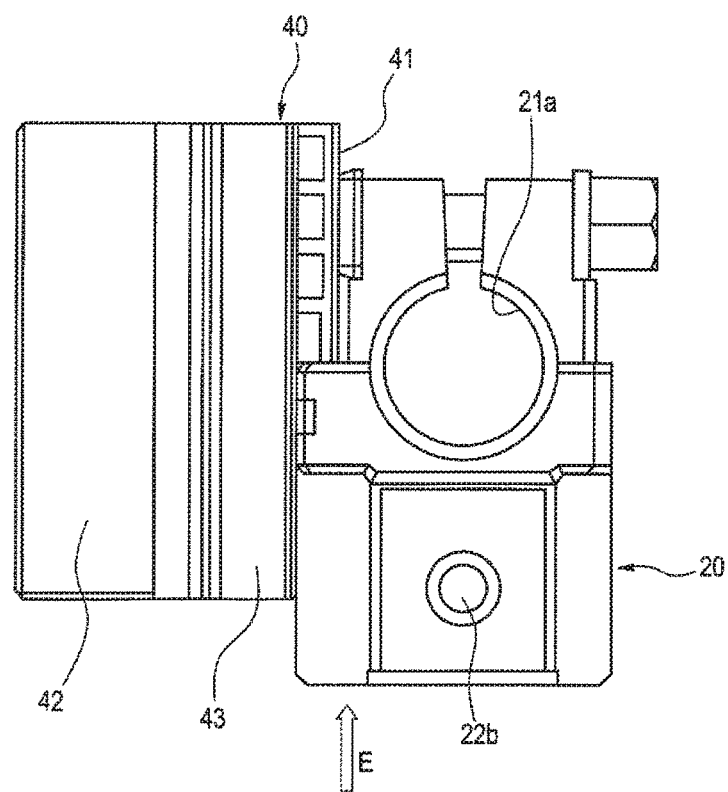
FIG. 11 is a plan view of a state in which the battery terminal is attached to the terminal-securing auxiliary member illustrated in FIG. 6.
Figure 12:
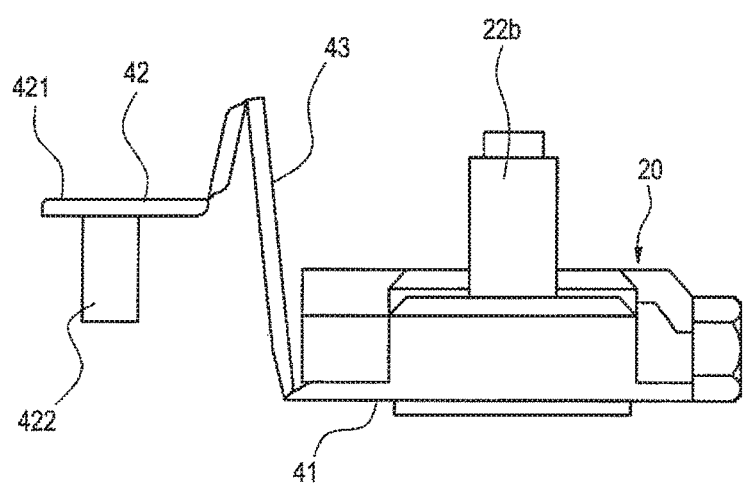
FIG. 12 is a view as seen in a direction indicated by an arrow E in FIG. 11.
Figure 13:
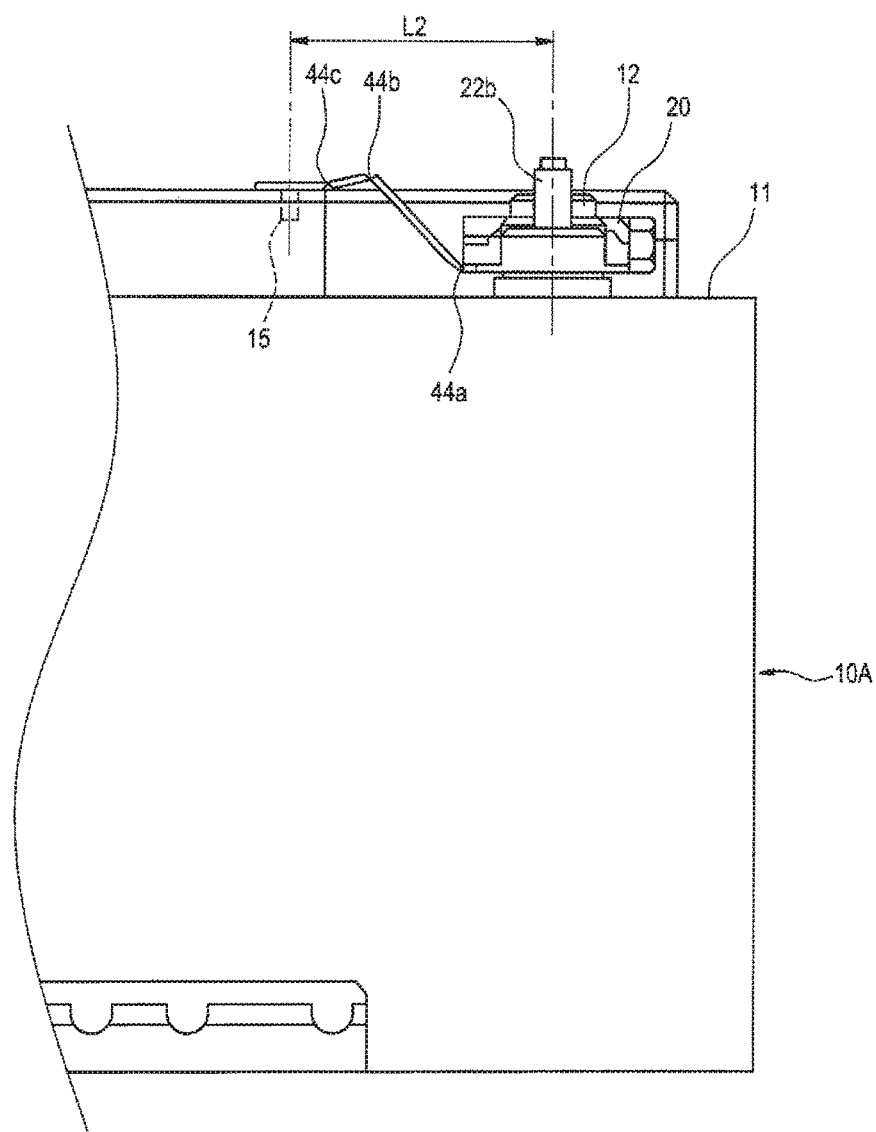
FIG. 13 is a side view of the battery illustrating a state in which the terminal-securing auxiliary member of the embodiment is attached to a battery of different dimensions.
Figure 14:
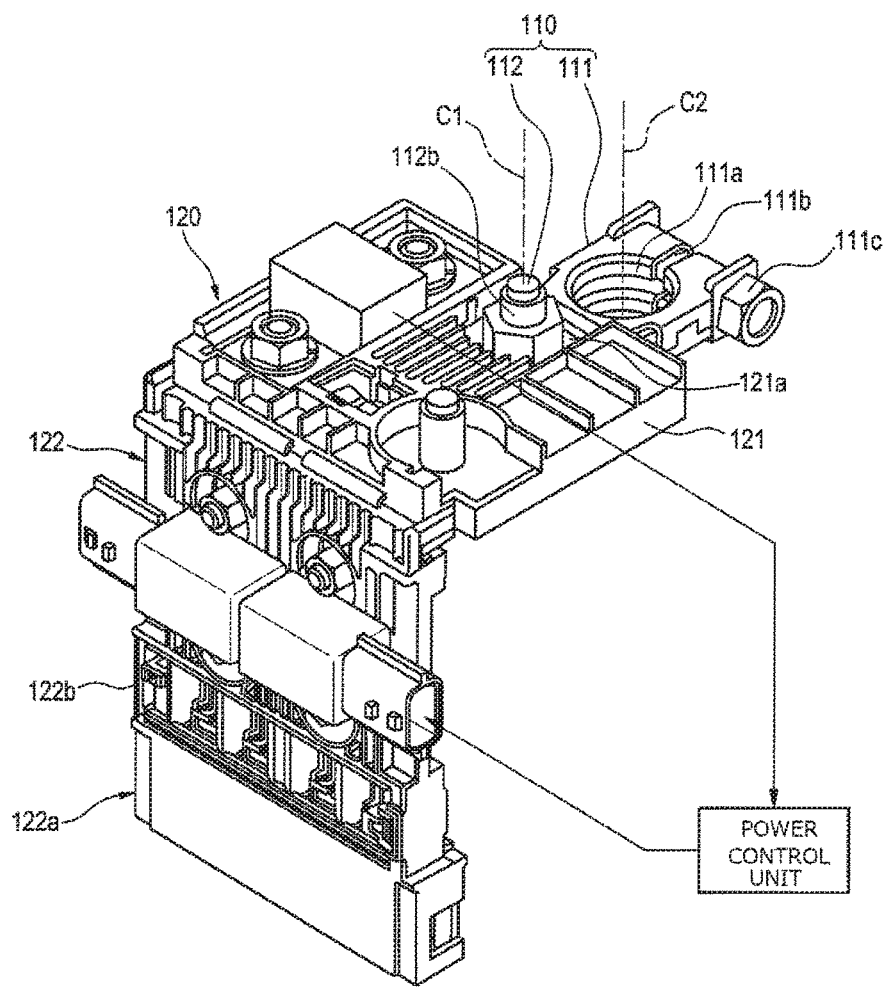
FIG. 14 is a perspective view of a related-art attaching structure of a battery-direct-attached type fuse unit to a battery.

FIGS. 1 to 3 illustrate an exemplary embodiment of a terminal-securing auxiliary member according to the invention. FIG. 1 is a perspective view of a battery terminal which is attached to a battery by assembling thereto a terminal-securing auxiliary member according to the embodiment of the invention, FIG. 2 is a plan view of a state in which the battery terminal is positioned on the battery by the terminal-securing auxiliary member according to the embodiment of the invention, FIG. 3 is a view as seen in a direction indicated by an arrow A in FIG. 2, FIG. 4 is a plan view of the battery illustrated in FIG. 1, FIG. 5 is a sectional view taken along a line V-V in FIG. 4, FIG. 6 is a perspective view illustrating an unassembled state of the terminal-securing auxiliary member according to the embodiment of the invention and the battery terminal, FIG. 7 is a perspective view of a state in which a connecting portion of the terminal-securing auxiliary member according to the embodiment of the invention extends flat out, FIG. 8 is a plan view of the terminal-securing auxiliary member illustrated in FIG. 7, FIG. 9 is a view as seen in a direction indicated by an arrow C in FIG. 8, FIG. 10 is a sectional view taken along a line X-X in FIG. 8, FIG. 11 is a plan view of a state in which the battery terminal is attached to the terminal-securing auxiliary member illustrated in FIG. 6, FIG. 12 is a view as seen in a direction indicated by an arrow E in FIG. 11, and FIG. 13 is a side view of the battery illustrating a state in which the terminal-securing auxiliary member of the embodiment is attached to a battery of different dimensions.

A terminal-securing auxiliary member 40 of the embodiment is attached to a battery terminal 20 which is fastened to a battery post 12 of a battery 10 to thereby secure the attaching orientation of the battery terminal 20 which is fastened to the battery post 12 in a proper attaching orientation, as illustrated in FIG. 1.

Figure 4:
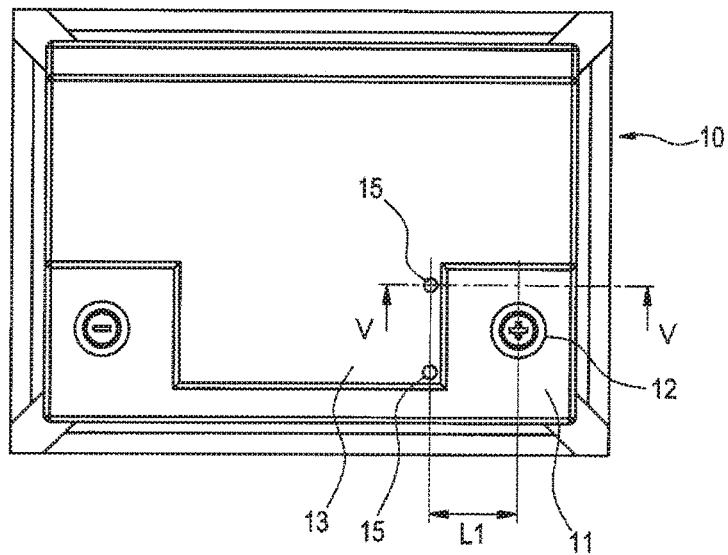
FIG. 4 is a plan view of the battery illustrated in FIG. 1.

The battery post 12 is a pillar-shaped electrode provided on the battery 10 and is disposed at a post disposing portion 11 lying in a corner portion of an upper surface of the battery 10, as illustrated in FIGS. 1 and 4. The post disposing portion 11 is provided in a position which lies lower by one step than a battery upper surface 13 to restrict the battery terminal 20 which is fastened to the battery post 12 from protruding upwards of the battery upper surface 13.

Figure 5:
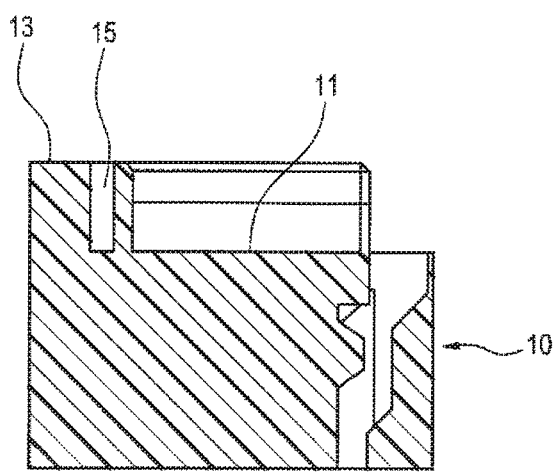
FIG. 5 is a sectional view taken along a line V-V in FIG. 4.

As illustrated in FIGS. 4 and 5, a pair of attaching holes 15 as a portion of irregular height with which a battery joining portion 42 of the terminal-securing auxiliary member 40 engages are provided on the battery upper surface 13 in a position in a circumferential edge of the post disposing portion 11. The pair of attaching holes 15 are cover attaching holes which are existing on the battery upper surface 13 for attachment of a post cover (not illustrated) which covers the battery post 12 from above. Namely, in this embodiment, the existing attaching holes 15 for attachment of the post cover are used for engagement of the terminal-securing auxiliary member 40. As illustrated in FIGS. 3 and 4, in the battery 10 in this embodiment, a separation distance between the pair of attaching holes 15 and the battery post 12 is L1.

As illustrated in FIGS. 2 and 6, the battery terminal 20 includes a post fastening portion 21 which is fastened to the battery post 12 and a fuse unit attaching portion 22 to which a battery-direct-attached type fuse unit is screwed.

As illustrated in FIG. 6, the post fastening portion 21 includes a post insertion hole 21a through which the battery post 12 is inserted, a slit portion 21b which cuts to separate partially the post insertion hole 21a, a tightening screw 21c which tightens to narrow a gap at the slit portion 21b to thereby secure the post fastening portion 21 to the battery post 12.

As illustrated in FIG. 6, the fuse unit attaching portion 22 is such that a stud bolt 22b is provided on a conduction plate portion 22a which is integral with the post fastening portion 21 so as to rise therefrom. The stud bolt 22b is provided so that an extending direction of a center axis C3 thereof is parallel to the direction of a center axis C4 of the post insertion hole 21a of the post fastening portion 21, as illustrated in FIG. 6.

FIG. 2 illustrates a state in which the battery terminal 20 is attached to the battery post 12 of the battery 10 in a proper attaching orientation. The proper attaching orientation of the battery terminal 20 is, as illustrated in FIG. 2, an orientation in which a straight line K that connects the center of the post insertion hole 21a and the center of the stud bolt 22b perpendicularly intersects a side surface 16 of the battery 10.

Figure 15:
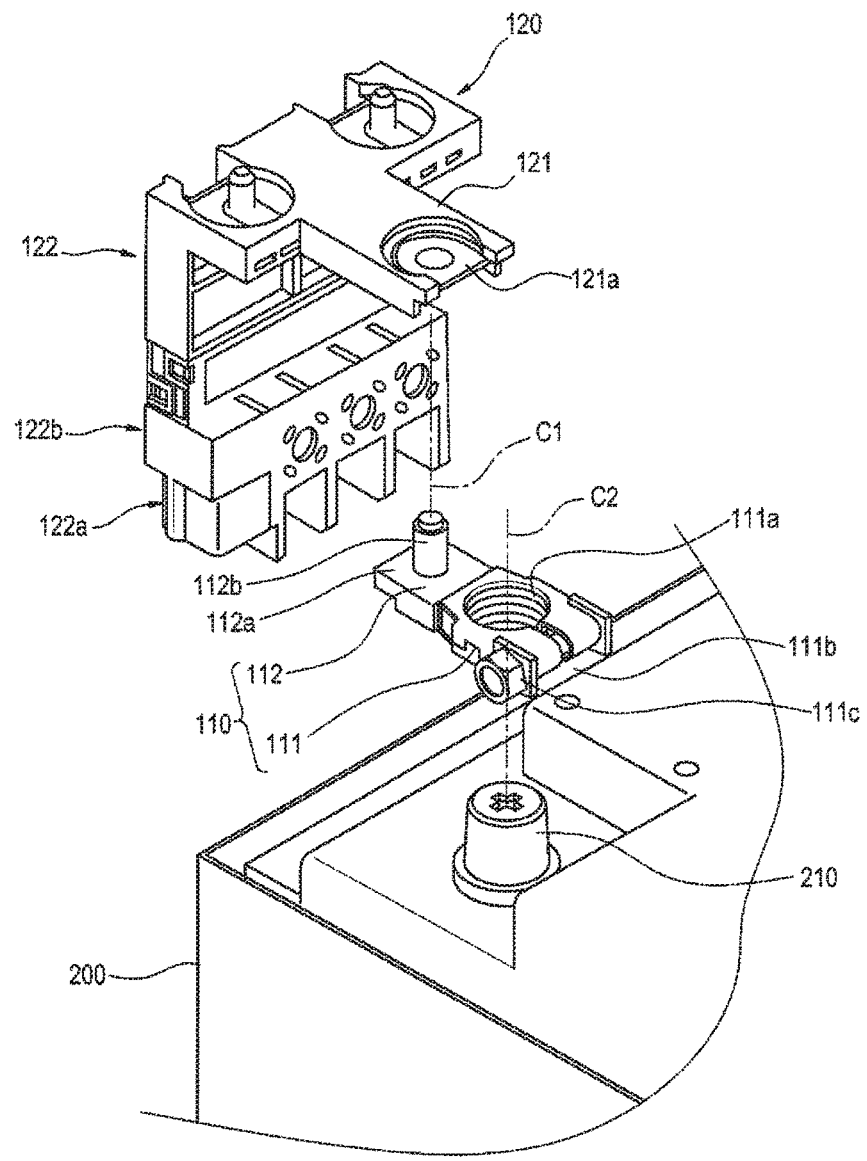
FIG. 15 is an exploded perspective view of a battery terminal and a battery-direct-attached type fuse unit which are connected to a battery post using similar attaching structure as that illustrated in FIG. 14.
Figure 16:
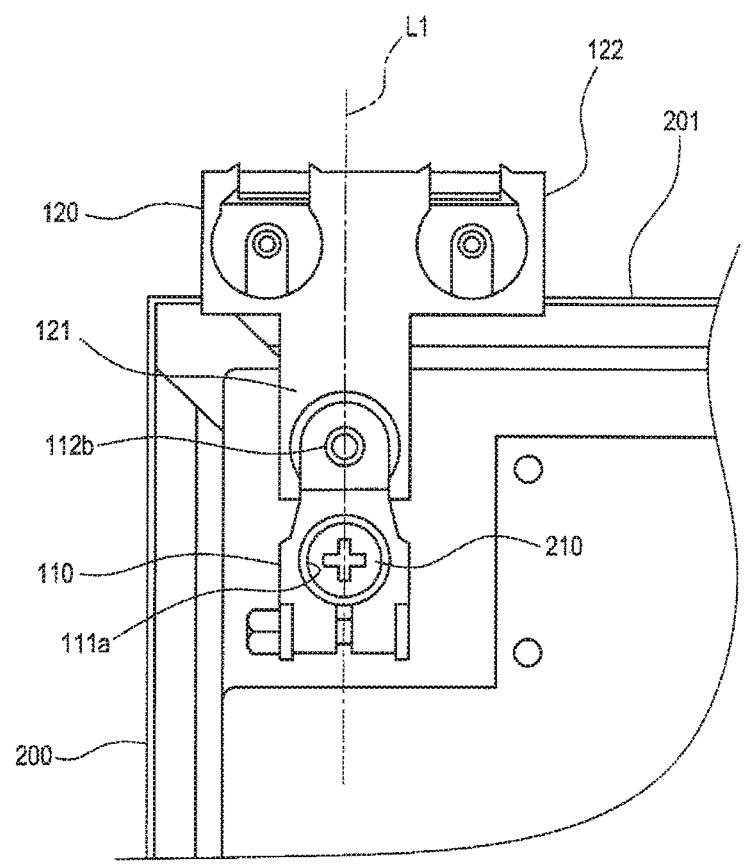
FIG. 16 is a plan view illustrating a state in which the battery terminal illustrated in FIG. 15 is attached to the battery in a proper attaching orientation.
Figure 17:
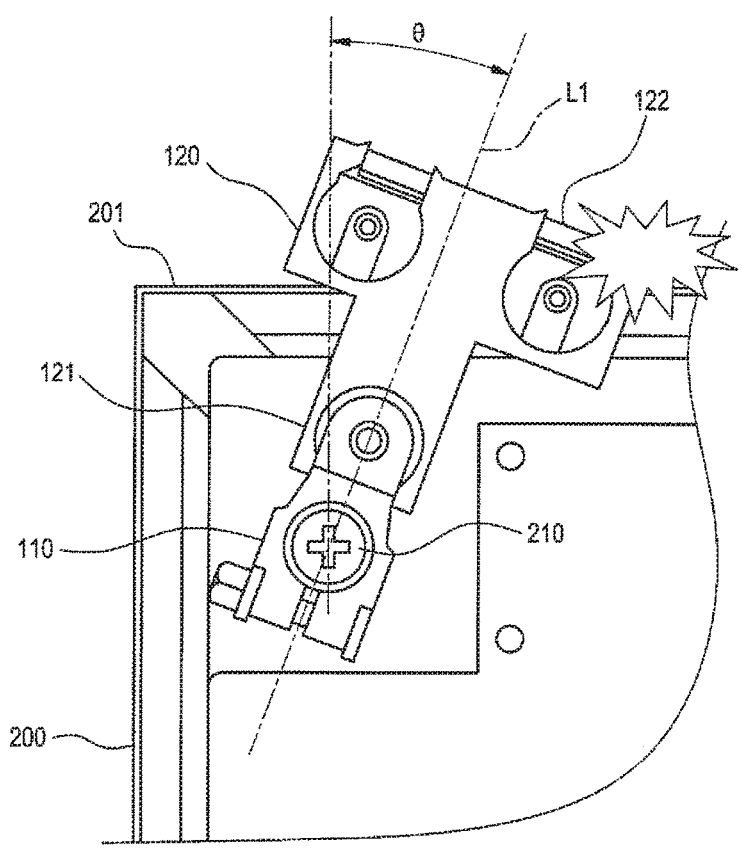
FIG. 17 is a plan view of a state in which the attaching orientation of the battery terminal illustrated in FIG. 15 is inclined from the proper attaching orientation.

The battery-direct-attached type fuse unit which is fastened to the fuse unit attaching portion 22 can be given the same configuration as that of the battery-direct-attached type fuse unit 120 illustrated in FIG. 15.

The terminal-securing auxiliary member 40 of this embodiment is an integral product made from resin. As illustrated in FIGS. 6 and 7, this terminal-securing auxiliary member 40 includes a terminal securing portion 41, the battery joining portion 42 and a connecting portion 43.

The terminal securing portion 41 is a portion which is secured to a bottom surface of the battery terminal 20. This terminal securing portion 41 includes a base plate portion 41a which is superposed on the bottom surface of the battery terminal 20 and a terminal engaging portion 41b which rises from the base plate portion 41a to be engaged with a side portion of the battery terminal 20. A post insertion hole 41c through which the battery post 12 is inserted is formed in the base plate portion 41a in a position which corresponds to the post insertion hole 21a of the battery terminal 20 which is superposed on the base plate portion 41a.

In the terminal-securing auxiliary member 40, as indicated by an arrow M in FIG. 6, a lower surface of the battery terminal 20 is superposed on the base plate portion 41a of the terminal securing portion 41, the terminal engaging portion 41g of the terminal securing portion 41 is engaged with a side portion of the battery terminal 20, whereby the terminal-securing auxiliary member 40 is secured to the battery terminal 20.

The battery joining portion 42 includes a base plate portion 421 which is superposed on the battery upper surface 13 and a pair of projections 422 which are provided on a rear surface of the base plate portion 421 so as to project therefrom. The pair of projections 422 are projections which are engaged with the pair of attaching holes 15 in the battery upper surface 13. The battery joining portion 42 is restricted from moving in a direction along the battery upper surface 13 to thereby be secured to the battery 10 by engaging the pair of projections 422 with the pair of attaching holes 15.

The connecting portion 43 is a plate-shaped portion where the terminal securing portion 41 and the battery joining portion 42 are connected together. The base plate portion 41a of the terminal securing portion 41 continues to one end (a right end in FIG. 8) of the connecting portion 43, and the base plate portion 421 of the battery joining portion 42 continues to the other end (a left end in FIG. 8) of the connecting portion 43.

The connecting portion 43 of this embodiment includes three thin hinge portions 44a, 44b, 44c which cross the connecting portion 43 in a direction (a direction indicated by an arrow Y1 in FIG. 8) perpendicular to a straight line that connects the terminal securing portion 41 with the battery joining portion 42. Each of the thin hinge portions 44a, 44b, and 44c is a thinner portion than the other portions of the connecting portion 43 and in which flexibility is given.

The thin hinge portion 44a is a hinge portion which is provided at a boundary portion between the connecting portion 43 and the terminal securing portion 41. This thin hinge portion 44a enables the boundary portion between the connecting portion 43 and the terminal securing portion 41 to be bent through valley folding, as illustrated in FIG. 6.

The thin hinge portion 44b is a hinge portion which is provided in a middle position between the connecting portion 43 and the terminal securing portion 41. This thin hinge portion 44b enables a central portion of the connecting portion 43 to be bent through mountain folding, as illustrated in FIG. 6.

The thin hinge portion 44c is a hinge portion which is provided at a boundary portion between the connecting portion 43 and the battery joining portion 42. This thin hinge portion 44c enables the boundary portion between the connecting portion 43 and the battery joining portion 42 to be bent through valley folding, as illustrated in FIG. 6.

In the connecting portion 43 of this embodiment, as illustrated in FIG. 6, a separation distance between the terminal securing portion 41 and the battery joining portion 42 can be adjusted by adjusting respective bending angles of the thin hinge portions 44a, 44b, 44c.

The terminal-securing auxiliary member 40 described as has been heretofore is attached to the battery terminal 20 before the battery terminal 20 is fastened to the battery post 12.

Then, as illustrated in FIG. 1, in attaching the battery terminal 20 to which the terminal-securing auxiliary member 40 is assembled to the battery post 12, the respective bending angles of the thin hinge portions 44a, 44b, 44c on the connecting portion 43 are adjusted so that the pair of projections 422 on the battery joining portion 42 fit in the attaching holes 15 in the battery upper surface 13, and the pair of projections 422 on the battery joining portion 42 are fitted in the corresponding fitting holes 15 in the battery upper surface 13.

Then, the battery joining portion 42 is secured to the battery as a result that the pair of projections 422 on the battery joining portion 42 are engaged with the attaching holes 15 in the battery upper surface 13. Then, the battery terminal 20 is prevented from rotating around the battery post 12 by the terminal-securing auxiliary member 40, whereby the attaching orientation of the battery terminal 20 is secured in the proper attaching orientation.

As illustrated in FIG. 3, in the terminal-securing auxiliary member 40 of this embodiment, by adjusting the respective bending angles of the thin hinge portions 44a, 44b, 44c in the connecting portion 43, the separation distance between the terminal securing portion 41 and the battery joining portion 42 is matched to the separation distance L1 between the battery post 12 of the battery 10 and the attaching holes 15. However, as to the separation distance between the battery post 12 and the attaching holes 15, the terminal-securing auxiliary member 40 can deal with not only the distance L1 but also other distances.

For example, in the event that the respective bending angles of the thin hinge portions 44a, 44b, 44c of the connecting portion 43 are adjusted to be less steep, as illustrated in FIG. 13, than the bending angles of those hinge portions illustrated in FIG. 3, the separation distance between the terminal securing portion 41 and the battery joining portion 42 is increased so that the terminal-securing auxiliary member 40 enables the battery terminal 20 to be attached to a battery 10A in which a separation distance between a battery post 12 and attaching holes 15 is L2 which is greater than L1 illustrated in FIG. 3. Although not illustrated, in the event that the respective bending angles of the thin hinge portions 44a, 44b, 44c of the connecting portion 43 are adjusted to be steeper than the bending angles of those hinge portions illustrated in FIG. 3, the separation distance between the terminal securing portion 41 and the battery joining portion 42 is decreased so that the terminal-securing auxiliary member 40 enables the battery terminal 20 to be attached to other batteries in which a separation distance between a battery post 12 and attaching holes 15 takes a value which is smaller than L1 illustrated in FIG. 3.

The terminal-securing auxiliary member 40 of the embodiment which has been described heretofore can be secured to the battery terminal 20 by engaging the terminal securing portion 41 with a lower face of the battery terminal 20. Then, as illustrated in FIG. 1, in the event that the battery terminal 20 to which the terminal-securing auxiliary member 40 is assembled is fastened to the battery post 12 of the battery 10, the pair of projections 422 on the battery joining portion 42 are engaged with the pair of attaching holes 15 which are the portion of the irregular height on the battery upper surface 13, whereby as illustrated in FIG. 2, the attaching orientation of the battery terminal 20 is secured in the proper attaching orientation.

This can prevent the inclination of the attaching orientation of the battery terminal 20. Consequently, it is possible to surely prevent the interference of the battery-direct-attached type fuse unit fastened to the distal end of the battery terminal 20 with the side surface of the battery 10 which would otherwise be caused as a result of the inclination of the attaching orientation of the battery terminal 20. Consequently, it is possible to prevent the damage of the battery-direct-attached type fuse unit which would otherwise be caused as a result of the interference with the side surface 16 of the battery 10.

The terminal-securing auxiliary member 40 of the embodiment is interposed between the battery terminal 20 and the battery 10 to thereby restrict the battery terminal 20 from rotating about the battery post 12 as the rotation center. This obviates the necessity of modifying the constructions of the battery terminal 20 and the battery-direct-attached type fuse unit. Consequently, the battery terminal 20 and the battery-direct-attached type fuse unit do not have to be newly redesigned, and the prevention of interference of the battery-direct-attached type fuse unit with the battery 10 can be realized inexpensively. The interference preventing structure can also be realized on the existing products of battery terminals 20 and battery-direct-attached type fuse units.

In the case of the terminal-securing auxiliary member 40 of the embodiment, the portion of the irregular height on the battery upper surface 13 with which the battery joining portion 42 is engaged are the attaching holes which are ordinarily provided on the battery upper surface 13 for attachment of the post cover which covers the battery post 12 from above. Namely, no exclusive engaging structure has to be added to the battery 10 for attachment of the terminal-securing auxiliary member 40, and the terminal-securing auxiliary member 40 of the embodiment can be applied to an existing battery 10 without any modification made on the battery to realize the prevention of interference of the battery-direct-attached type fuse unit with the battery.

In the case of the terminal-securing auxiliary member 40 of the embodiment, the separation distance between the terminal securing portion 41 and the battery joining portion 42 can be adjusted by adjusting the bending angles of the thin hinge portions 44a, 44b, 44c which are provided at the connecting portion 43. Because of this, the terminal-securing auxiliary member 40 of the embodiment can be used on different types of batteries 10 among which separation distances between the battery post 12 of the battery 10 and the portion of the irregular height on the battery upper surface 13 differ. Thus, the versatility of the terminal-securing auxiliary member 40 can be enhanced. In this embodiment, the plurality of thin hinge portions are described as being provided, however, only one thin hinge portion may be provided.

The invention is not limited to the embodiment that has been described heretofore but can be modified or improved as required. In addition, the materials, shapes, dimensions, numbers and where to locate the constituent elements of the embodiment are arbitrary and not limited in any way, as long as the invention can be achieved.

Here, the characteristics of the embodiment of the terminal-securing auxiliary member according to the invention described above will be itemized briefly under [1] to [3] below.

[1] The terminal-securing auxiliary member (40) including:

the terminal securing portion (41) which is to be fastened to the battery post (12) which is disposed at the post disposing portion (11) of the battery (10) and which is to be secured to the battery terminal (20) to which the battery-direct-attached type fuse unit is to be fastened;

the battery joining portion (42) which engages with the portion (15) of the irregular height on the battery upper surface (13) in the circumferential edge of the post disposing portion (11) to restrict movement in the direction along the battery upper surface (13); and the connecting portion (43) which connects the terminal securing portion (41) and the battery joining portion (42).

[2] The terminal-securing auxiliary member (40) according to [1] above, wherein the portion of the irregular height includes the pair of attaching holes (15) which are provided in the battery upper surface (13) for attachment of the post cover that covers the battery post (12) from above.

[3] The terminal-securing auxiliary member (40) according to [1] or [2] above, wherein the connecting portion (43) includes the thin hinge portions (44a, 44b, 44c) which cross the connecting portion in the direction perpendicular to the straight line that connects the terminal securing portion (41) and the battery joining portion (42), and the separation distance between the terminal securing portion (41) and the battery joining portion (42) is adjusted by adjusting the bending angles of the thin hinge portions (44a, 44b, 44c).

While the invention has been described in detail and by reference to the specific embodiment, it is obvious to those skilled in the art to which the invention pertains that various alterations and/or modifications can be added to the embodiment without departing from the spirit and scope of the invention.

This patent application is based on Japanese Patent Application (No. 2013-163276) filed on Aug. 6, 2013, the contents of which are incorporated herein by reference.

According to the terminal-securing auxiliary member of the invention, the battery-direct-attached type fuse unit which is connected to the battery terminal can be prevented from interfering with the side surface of the battery without altering the construction of the existing terminal and battery-direct-attached type fuse unit. The invention which can provide this effect is useful for the terminal-securing auxiliary member which secures the battery terminal to the battery.

What is claimed is:

1. A terminal-securing auxiliary member for fixing a battery terminal relative to a battery in a predetermined orientation, the battery having a battery post disposed at a post disposing portion of the battery, the battery terminal configured to be secured to the battery post and configured to be to fastened to a battery-direct-attached type fuse unit, the battery further having a portion of irregular height on an upper surface thereof in a circumferential edge of the post disposing portion, the terminal-securing auxiliary member comprising:

a terminal securing portion which is configured to be fastened to the battery post and which is configured to be secured to the battery terminal;

a battery joining portion which is configured to engage a mating structure located on the portion of the irregular height to restrict movement in a direction along the upper surface of the battery, and the battery joining portion is configured to position the battery terminal in the predetermined orientation when the battery joining portion engages the mating structure located on the portion of the irregular height; and a connecting portion which connects the terminal securing portion and the battery joining portion.

2. The terminal-securing auxiliary member according to claim 1, wherein the mating structure includes a pair of attaching holes which are provided in the upper surface of the battery and configured for attachment of a post cover that covers the battery post from above, and the battery joining portion includes a pair of projections configured to be inserted into the pair of attaching holes.

3. The terminal-securing auxiliary member according to claim 1, wherein the connecting portion comprises a hinge portion which crosses the connecting portion in a direction perpendicular to a straight line that connects the terminal securing portion and the battery joining portion, and a separation distance between the terminal securing portion and the battery joining portion is adjusted by adjusting a bending angle of the hinge portion.

4. The terminal-securing auxiliary member according to claim 3, wherein the hinge portion is a thinner portion than the other portions of the connecting portion.

5. The terminal-securing auxiliary member according to claim 1, wherein the projection includes a pair of cylindrical posts.

6. The terminal-securing auxiliary member according to claim 1, wherein each of the terminal securing portion, the battery joining portion and the connecting portion includes a flat plate, and the projection extends away from the flat plate of the battery joining portion.

7. The terminal-securing auxiliary member according to claim 1, wherein the connecting portion is connected to the terminal securing portion such that the connecting portion is movable relative to the terminal securing portion, and the connecting portion is connected to the battery joining portion such that the connecting portion and the battery joining portion are movable relative to each other.

8. The terminal-securing auxiliary member according to claim 1, wherein
the connecting portion includes a first hinge and a second hinge, the first hinge is connected to the terminal securing portion, and the second hinge is connected to the battery joining portion.

9. The terminal-securing auxiliary member according to claim 8, wherein
the first hinge extends parallel to the second hinge.

10. The terminal-securing auxiliary member according to claim 8, wherein
the connecting portion includes a first connecting portion, a second connecting portion, and a third hinge, the first hinge connects the first connecting portion to the terminal securing portion, the second hinge connects the second connecting portion to the battery joining portion, and the third hinge connects the first connecting portion to the second connecting portion.

11. The terminal-securing auxiliary member according to claim 1, wherein
the terminal securing portion includes a flat base plate and a terminal engaging structure, the base plate defines a post insertion hole that is configured to be fastened to the battery post, and the terminal engaging structure extends from the base plate and is configured to be secured to the battery terminal.

12. The terminal-securing auxiliary member according to claim 11, wherein
the projection includes a pair of posts extending from a surface of the battery joining portion in direction opposite to a direction in which the terminal engagement structure extends when the terminal engaging portion, the connecting portion, and the battery joining portion are positioned in parallel alignment with each other.

13. The terminal-securing auxiliary member according to claim 11, wherein
the terminal engaging structure extends from the base plate in a direction that is parallel to an axis of the post insertion hole.

14. The terminal-securing auxiliary member according to claim 1, wherein
the terminal securing portion includes a flat base plate, a first terminal engaging structure, and a second terminal engaging structure, the base plate defines a post insertion hole configured to be fastened to the battery post, the post insertion hole is located between the first terminal engaging structure and the second terminal engaging structure, and the first and second terminal engaging structures extend from the base plate and are configured to be secured to the battery terminal.

15. The terminal-securing auxiliary member according to claim 14, wherein
the first terminal engaging structure is asymmetrical with the second terminal engaging structure.

16. The terminal-securing auxiliary member according to claim 14, wherein
the second terminal engaging structure includes a first portion and a second portion, the first portion is symmetrical with a first portion of the first terminal engaging structure, and the second portion is asymmetrical with a second portion of the first terminal engaging structure.

* * * * *